US012738230B2

(12) United States Patent
Kim et al.

(10) Patent No.: US 12,738,230 B2
(45) Date of Patent: Sep. 15, 2026

(54) DISPLAY DEVICE

(71) Applicant: LG Display Co., Ltd., Seoul (KR)

(72) Inventors: JungJae Kim, Paju-si (KR); InRae Park, Paju-si (KR); Taehwa Park, Paju-si (KR); Dongju Kim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 19/336,839

(22) Filed: Sep. 23, 2025

(65) Prior Publication Data

US 2026/0134838 A1 May 14, 2026

(30) Foreign Application Priority Data

Nov. 14, 2024 (KR) ........................ 10-2024-0162433

(51) Int. Cl.
*G09G 3/20* (2006.01)
*G09G 3/3258* (2016.01)
(Continued)

(52) U.S. Cl.
CPC ......... *G09G 3/3258* (2013.01); *G09G 3/2011* (2013.01); *G09G 3/2074* (2013.01); *G09G 3/3225* (2013.01); *G09G 3/3233* (2013.01); *G09G 3/3291* (2013.01); *G09G 2300/0852* (2013.01); *G09G 2310/08* (2013.01);
(Continued)

(58) Field of Classification Search
CPC ......... G09G 3/3258; G09G 2300/0852; G09G 2310/08; G09G 2330/021; G09G 3/2011; G09G 3/2074; G09G 3/3225; G09G 3/3233; G09G 3/3291; G09G 2330/028; G09G 2360/16
See application file for complete search history.

(56) References Cited

U.S. PATENT DOCUMENTS 10,897,151 B2 * 1/2021 Song ....................... H02J 7/865
12,142,204 B2 * 11/2024 Kim .................... H01M 10/425
(Continued)

FOREIGN PATENT DOCUMENTS

KR 10-2401558 B1 5/2022
KR 10-2022-0095888 A 7/2022
KR 10-2024-0128178 A 8/2024

*Primary Examiner* — Douglas Wilson
(74) *Attorney, Agent, or Firm* — Morgan, Lewis & Bockius LLP

(57) ABSTRACT

A display device includes: a display panel including sub-pixels configured to sequentially emit light along rows based on an emission control signal; a driving voltage supply circuit for supplying a driving voltage to the display panel through a driving voltage line; a charge storage circuit electrically connected to the driving voltage line; and a controller for controlling the driving voltage supply circuit and the charge storage circuit. The controller may output a control signal to the charge storage circuit based on changes in image gradation per region of the display panel. The charge storage circuit includes a plurality of switches connected in parallel to the driving voltage line and a plurality of capacitors electrically connected respectively to the plurality of switches and control the plurality of switches based on the control signal. Accordingly, it is possible to prevent or suppress variation in the driving voltage and the data voltage.

19 Claims, 12 Drawing Sheets

(51) Int. Cl.
*G09G 3/3225* (2016.01)
*G09G 3/3233* (2016.01)
*G09G 3/3291* (2016.01)

(52) U.S. Cl.
CPC . *G09G 2330/021* (2013.01); *G09G 2330/028* (2013.01); *G09G 2360/16* (2013.01)

(56) References Cited

U.S. PATENT DOCUMENTS

| | | | | |
|---|---|---|---|---|
| 12,548,519 | B2 * | 2/2026 | Pyun | G09G 3/3241 |
| 2017/0054370 | A1 | 2/2017 | Lee et al. | |
| 2022/0208938 | A1 | 6/2022 | Kim et al. | |
| 2024/0282264 | A1 | 8/2024 | Pyun et al. | |

* cited by examiner

DISPLAY DEVICE

CROSS REFERENCE TO RELATED APPLICATION

This application claims priority from Korean Patent Application No. 10-2024-0162433, filed on Nov. 14, 2024, which is hereby incorporated by reference for all purposes as if fully set forth herein.

BACKGROUND

Technical Field

Embodiments of the present disclosure relate to a display device.

Description of Related Art

The display device may include a display panel for displaying an image, a data driving circuit for supplying a data voltage to the display panel, and a driving voltage supply circuit for supplying a driving voltage to the display panel.

While a fluctuation occurs in the current conducted to the display panel, a variation in constant voltage may occur within the display device. As the variation in the constant voltage occurs within the display device, non-uniformity may appear in the display panel. Accordingly, a countermeasure for preventing voltage fluctuation may be needed or useful.

SUMMARY

Embodiments of the present disclosure may provide a display device that minimizes or reduces ripple in the driving voltage caused by current variation in the display panel.

Embodiments of the present disclosure may provide a display device that prevents or suppresses fluctuation in the driving voltage and includes a charge storage circuit electrically connected to a driving voltage supply circuit.

Embodiments of the present disclosure may provide a display device including a controller that outputs a control signal to the charge storage circuit, which prevents or suppresses fluctuations in the driving voltage.

To achieve these and other objects and advantages of the present disclosure, as embodied and broadly described herein, embodiments of the present disclosure may provide a display device comprising: a display panel in which a plurality of sub-pixels are arranged in a matrix and are configured to sequentially emit light along rows; a driving voltage supply circuit configured to supply a driving voltage to the display panel; a charge storage circuit electrically connected to the driving voltage supply circuit; and a controller configured to control the driving voltage supply circuit and the charge storage circuit. The controller may output a control signal to the charge storage circuit according to an emission control signal for sequentially driving the plurality of sub-pixels. The charge storage circuit may include a plurality of switches electrically connected to the driving voltage supply circuit, and a plurality of capacitors electrically connected respectively to the plurality of switches. The plurality of switches may be controlled based on the control signal output from the controller to the charge storage circuit.

In another aspects of the present disclosure, embodiments of the present disclosure may provide a display device comprising: a display panel in which a plurality of sub-pixels are arranged in a matrix and are configured to sequentially emit light along rows; a driving voltage supply circuit configured to supply a driving voltage to the display panel; a charge storage circuit electrically connected to the driving voltage supply circuit; and a controller configured to control the driving voltage supply circuit and the charge storage circuit. The controller may output a data signal to the charge storage circuit according to a plurality of emission control signals for sequentially driving the sub-pixels. The charge storage circuit may include a plurality of switches electrically connected to the driving voltage supply circuit, a plurality of capacitors electrically connected respectively to the plurality of switches, and a decoder configured to control the plurality of switches. The plurality of switches may be controlled according to the data signal output from the controller to the charge storage circuit.

According to embodiments of the present disclosure, it may be possible to provide a display device including a charge storage circuit that prevents or suppresses fluctuation in the driving voltage by charging and discharging voltages of a plurality of capacitors.

According to embodiments of the present disclosure, it may be possible to provide a display device including a controller that controls the plurality of switches in the charge storage circuit by outputting a plurality of control signals.

According to embodiments of the present disclosure, by minimizing or reducing voltage fluctuation, surplus power to correct the fluctuation may be saved. As a result of saving surplus power, the display device may be driven with lower power consumption.

BRIEF DESCRIPTION OF THE DRAWINGS

The accompanying drawings, that are included to provide a further understanding of the disclosure and are incorporated in and constitute a part of the disclosure, illustrate example embodiments of the disclosure and together with the description serve to explain various principles of the disclosure.

DETAILED DESCRIPTION

Figure 1:
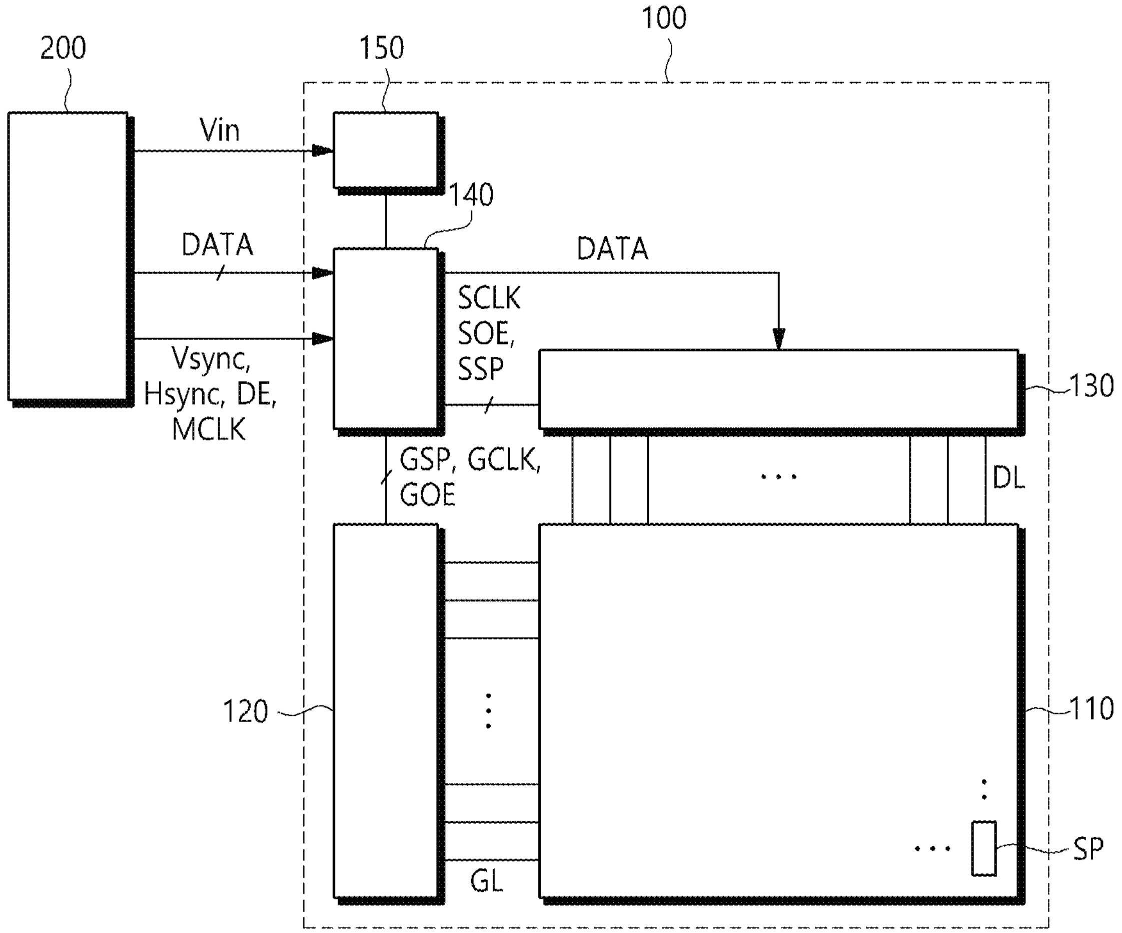
FIG. 1 is a system configuration diagram of a display device according to example embodiments of the present disclosure.

In the following description of examples or example embodiments of the present disclosure, reference will be made to the accompanying drawings in which it is shown by way of illustration specific examples or example embodiments that can be implemented, and in which the same reference numerals and signs can be used to designate the same or like components even when they are shown in different accompanying drawings from one another. Further, in the following description of examples or example embodiments of the present disclosure, detailed descriptions of well-known functions and components incorporated herein may be omitted when such descriptions may make the subject matter in some embodiments of the present disclosure rather unclear. The terms such as "including", "having", "containing", "constituting" "make up of", and "formed of" used herein are generally intended to allow other components to be added unless the terms are used with a more limiting term like "only". As used herein, singular forms are intended to include plural forms, and vice versa, unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to refer to the corresponding element separately from other elements.

Where it is mentioned that a first element "is connected or coupled to", "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

Where time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless a more limiting term like "directly" or "immediately" is used together.

In addition, where any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a system configuration diagram of a display device 100 according to example embodiments of the present disclosure.

As shown in FIG. 1, the display device 100 according to an example embodiment of the present disclosure may include a display panel 110 in which a plurality of gate lines GL and data lines DL are connected and a plurality of sub-pixels SP are arranged in a matrix; a gate driving circuit 120 that drives the plurality of gate lines GL; a data driving circuit 130 that supplies a data voltage through the plurality of data lines DL; a controller 140 that controls the gate driving circuit 120 and the data driving circuit 130; and a power management circuit 150.

The display panel 110 displays an image based on a scan signal supplied from the gate driving circuit 120 via the plurality of gate lines GL and a data voltage supplied from the data driving circuit 130 via the plurality of data lines DL.

In the case of a liquid crystal display, the display panel 110 may include a liquid crystal layer formed between two substrates, and may operate in any known mode such as a twisted nematic (TN) mode, vertical alignment (VA) mode, in-plane switching (IPS) mode, or fringe field switching (FFS) mode. In contrast, in the case of an organic light-emitting display, the display panel 110 may be implemented in a top emission type, bottom emission type, or dual emission type.

The display panel 110 may have a matrix array of a plurality of pixels, and each pixel may include sub-pixels SP of different colors, for example, white, red, green, and blue sub-pixels. Each sub-pixel SP may be defined by the plurality of data lines DL and the plurality of gate lines GL.

One sub-pixel SP may include a thin film transistor (TFT) formed at the intersection of a data line DL and a gate line GL, a light-emitting device such as an organic light-emitting diode that stores the data voltage, and a storage capacitor electrically connected to the light-emitting device to maintain the voltage.

For example, in a display device 100 having a resolution of 2,160×3,840 and composed of four sub-pixels SP (white, red, green, and blue), a total of 15,360 data lines DL may be provided by 2,160 gate lines GL and 3,840 data lines DL respectively connected to each of the four sub-pixels (WRGB), resulting in 3,840×4=15,360 data lines DL in total. Each sub-pixel SP is located at the intersection of the corresponding gate line GL and data line DL.

The gate driving circuit 120 is controlled by the controller 140 and sequentially outputs scan signals to the plurality of gate lines GL arranged on the display panel 110 to control the driving timing of the plurality of sub-pixels SP.

In the case of a display device 100 with a resolution of 2,160×3,840, sequentially outputting scan signals from the first to the 2,160th gate line is referred to as 2,160-phase driving. Alternatively, sequentially outputting scan signals in groups of four gate lines (e.g., from the first to the fourth gate line, and then from the fifth to the eighth gate line) is referred to as 4-phase driving. In general, sequentially outputting scan signals in units of N gate lines is referred to as N-phase driving.

The gate driving circuit 120 may include one or more gate driving integrated circuits GDIC (referring to FIG. 2), which may be disposed on one or both sides of the display panel 110 depending on the driving scheme. Alternatively, the gate driving circuit 120 may be embedded in a bezel area of the display panel 110 and implemented in a gate-in-panel (GIP) structure.

The data driving circuit 130 receives image data DATA from the controller 140, converts the image data into analog data voltage, and outputs the data voltage to the respective data lines DL in synchronization with the scan signal applied through the gate lines GL. Each sub-pixel SP connected to the data lines DL displays an emission control signal corresponding to the brightness of the data voltage.

Figure 2:
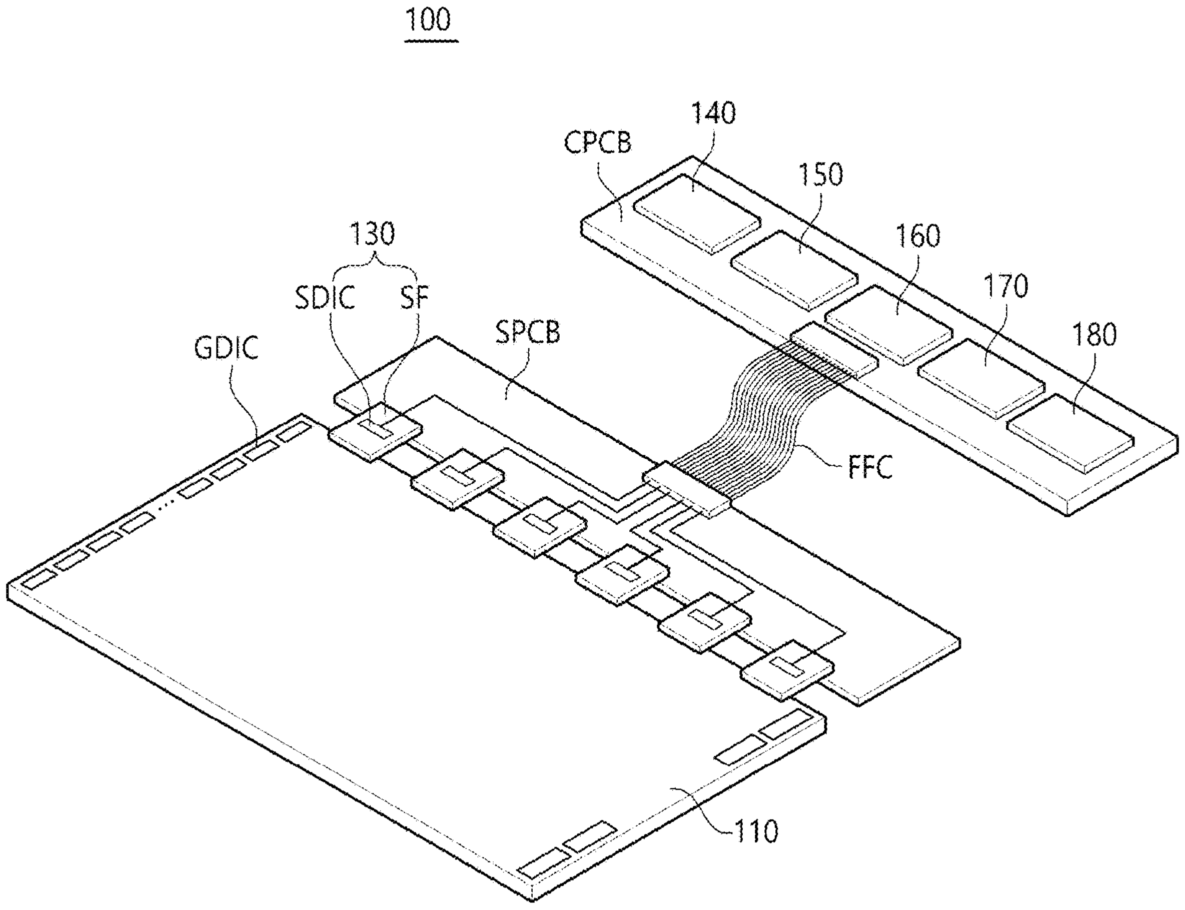
FIG. 2 is an example system diagram of a display device according to example embodiments of the present disclosure.

Similarly, the data driving circuit 130 may include one or more source driving integrated circuits SDIC (referring to FIG. 2). The source driving integrated circuits SDIC may be connected to bonding pads of the display panel 110 via a tape-automated bonding (TAB) method or a chip-on-glass (COG) method, or may be directly mounted on the display panel 110.

In some cases, each SDIC may be integrated directly into the display panel 110. Alternatively, the SDIC may be implemented in a chip-on-film (COF) structure, in which case each SDIC is mounted on a circuit film that is electrically connected to the data lines DL of the display panel 110.

The controller 140 supplies various control signals to the gate driving circuit 120 and the data driving circuit 130 and controls their operation. That is, the controller 140 controls the gate driving circuit 120 to output scan signals according to the timing of each frame, while providing image data DATA received from an external source to the data driving circuit 130.

The controller 140 receives various timing signals from an external host system 200, including a vertical sync signal Vsync, a horizontal sync signal Hsync, a data enable signal DE, and a main clock MCLK, along with the image data DATA.

The host system 200 may be any one of a television system, set-top box, navigation system, personal computer (PC), home theater system, mobile device, or wearable device.

Accordingly, the controller 140 generates control signals using the various timing signals received from the host system 200 and provides them to the gate driving circuit 120 and the data driving circuit 130.

For example, the controller 140 outputs various gate control signals to control the gate driving circuit 120, including gate start pulse GSP, gate clock GCLK, and gate output enable signal GOE. Here, the gate start pulse GSP controls the timing at which one or more gate driving integrated circuits GDIC, which constitute the gate driving circuit 120, begin operation. The gate clock GCLK is a clock signal commonly input to the one or more gate driving integrated circuits GDIC and controls the shift timing of the scan signal. The gate output enable signal GOE specifies timing information for the one or more gate driving integrated circuits GDIC.

In addition, the controller 140 outputs various data control signals to control the data driving circuit 130, including source start pulse SSP, source sampling clock SCLK, and source output enable signal SOE. Here, the source start pulse SSP controls the timing at which one or more source driving integrated circuits SDIC, which constitute the data driving circuit 130, start sampling data. The source sampling clock SCLK is a clock signal that controls the data sampling timing in the source driving integrated circuits SDIC. The source output enable signal SOE controls the output timing of the data driving circuit 130.

The display device 100 may include a power management circuit 150 that supplies various voltages or currents to the display panel 110, the gate driving circuit 120, and the data driving circuit 130, or controls the various voltages or currents to be supplied.

The power management circuit 150 adjusts a DC input voltage Vin supplied from the host system 200 and generates the power to drive the display panel 110, the gate driving circuit 120, and the data driving circuit 130.

Meanwhile, sub-pixels SP are located at the intersections of gate lines GL and data lines DL, and each sub-pixel SP may include a light-emitting device. For example, in an organic light-emitting display device, each sub-pixel SP includes a light-emitting device such as an organic light-emitting diode, and an image may be displayed by controlling the current flowing through the light-emitting device based on the data voltage.

The display device 100 may be any one of various types of display devices, such as a liquid crystal display (LCD), an organic light-emitting display (OLED), or a plasma display panel (PDP).

FIG. 2 illustrates an example of a system of a display device according to example embodiments of the present disclosure.

As shown in FIG. 2, the display device 100 according to example embodiments of the present disclosure illustrates a case where the data driving circuit 130 is implemented in a COF (Chip On Film) method among various methods such as TAB, COG, and COF, and the gate driving circuit 120 is implemented in a GIP (Gate In Panel) form among various methods such as TAB, COG, COF, and GIP.

When the gate driving circuit 120 is implemented in a GIP form, a plurality of gate driving integrated circuits GDIC included in the gate driving circuit 120 may be directly formed in the bezel area of the display panel 110. In this case, the gate driving integrated circuits GDIC may receive various signals for generating scan signals (such as clock signals, gate high signals, and gate low signals) through gate driving-related signal lines disposed in the bezel area.

Likewise, one or more source driving integrated circuits SDIC included in the data driving circuit 130 may be mounted on a source film SF, and one side of the source film SF may be electrically connected to the display panel 110. In addition, on the upper side of the source film SF, wirings for electrically connecting the source driving integrated circuit SDIC to the display panel 110 may be disposed.

The display device 100 may include at least one source printed circuit board SPCB for electrically connecting a plurality of source driving integrated circuits SDIC to other devices, and a control printed circuit board CPCB for mounting control components and various electrical devices.

In this case, the other side of the source film SF, on which the source driving integrated circuit SDIC is mounted, may be connected to the source printed circuit board SPCB. That is, the source film SF with the source driving integrated circuit SDIC mounted may have one side electrically connected to the display panel 110 and the other side electrically connected to the source printed circuit board SPCB.

The control printed circuit board CPCB may have the controller 140 and the power management circuit 150 mounted thereon. The controller 140 may control the operations of the data driving circuit 130 and the gate driving circuit 120. The power management circuit 150 may supply driving voltage or current to the display panel 110, the data driving circuit 130, and the gate driving circuit 120, or may control the voltage or current being supplied. The controller 140 and the power management circuit 150 may also be mounted on the source printed circuit board SPCB.

The at least one source printed circuit board SPCB and the control printed circuit board CPCB may be electrically connected through at least one connecting member, which may include, for example, a flexible printed circuit (FPC) or a flexible flat cable (FFC). Additionally, the source printed circuit board SPCB and the control printed circuit board CPCB may be implemented as an integrated single printed circuit board.

In this case, each sub-pixel SP arranged in the display panel 110 of the display device 100 may include a light-emitting device and circuit elements such as a driving transistor for driving the light-emitting device.

The types and number of circuit elements constituting each sub-pixel SP may be variously determined depending on the provided functions and design method.

The driving voltage supply circuit 160 may be mounted on the source printed circuit board SPCB. The driving voltage supply circuit 160 may be mounted on the control printed circuit board CPCB. The driving voltage supply circuit 160 may supply a driving voltage to the display panel 110.

The charge storage circuit 170 may be mounted on the source printed circuit board SPCB. The charge storage circuit 170 may be mounted on the control printed circuit board CPCB. The charge storage circuit 170 may be charged or discharged according to the voltage output and the current flowing from the driving voltage supply circuit 160 or the display panel 110. As the charge storage circuit 170 is charged or discharged, variation in the driving voltage or data voltage may be controlled.

The gamma voltage generation circuit 180 may generate a gamma reference voltage and output the generated gamma reference voltage to the data driving circuit 130. The data driving circuit 130 may generate a data voltage using the reference gamma voltage.

Figure 3:
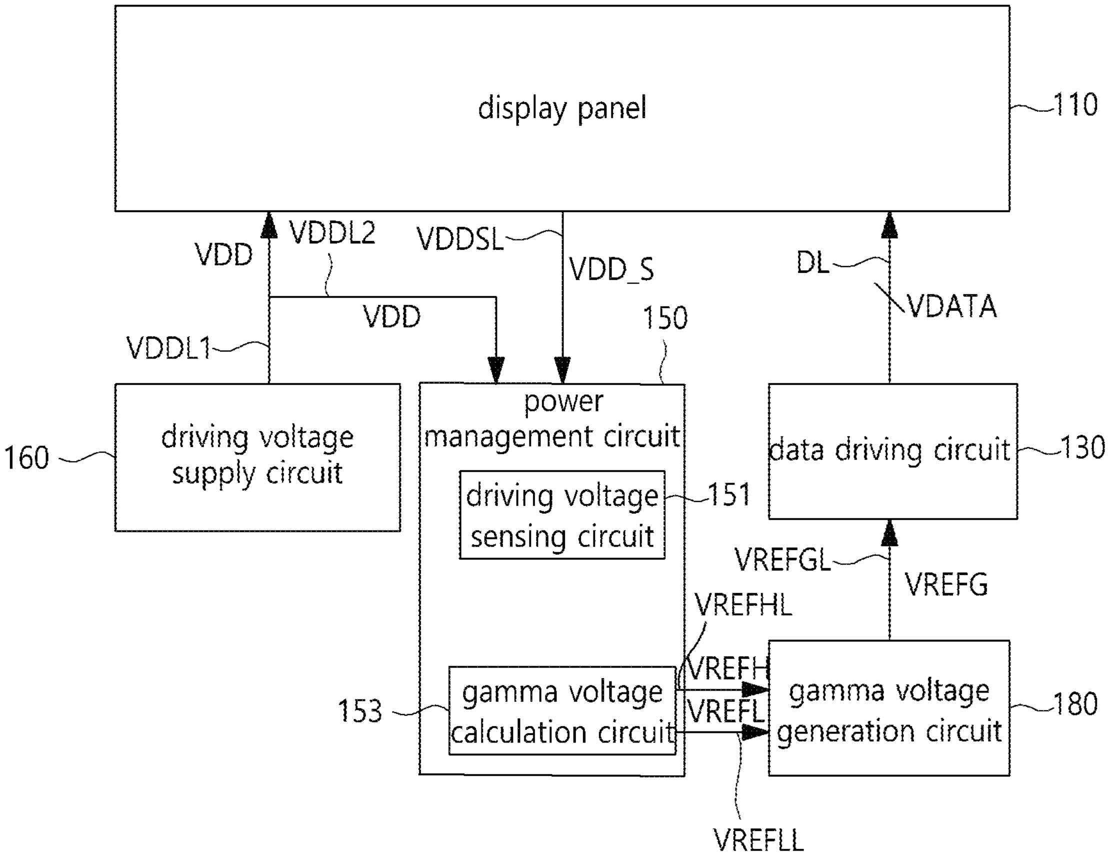
FIG. 3 is a diagram illustrating an operation of changing a data voltage in the display device according to example embodiments of the present disclosure.

FIG. 3 is a diagram illustrating, as an example, an operation of changing the data voltage VDATA of the display device 100 according to example embodiments of the present disclosure.

As shown in FIG. 3, the driving voltage supply circuit 160 may be electrically connected to the display panel 110 via a first driving voltage line VDDL1. The driving voltage supply circuit 160 may be electrically connected to the power management circuit 150 via a second driving voltage line VDDL2. The driving voltage supply circuit 160 may output a driving voltage VDD to the display panel 110 through the first driving voltage line VDDL1. The voltage supply circuit 160 may supply the driving voltage VDD to the power management circuit 150 through the second driving voltage line VDDL2.

The power management circuit 150 may be electrically connected to the display panel 110 via a driving voltage sensing line VDDSL. The power management circuit 150 may receive a sensed driving voltage VDD_S from the display panel 110 through the driving voltage sensing line VDDSL.

The power management circuit 150 may include a driving voltage sensing circuit 151 and a gamma voltage calculation circuit 153. The driving voltage sensing circuit 151 may sense the input sensed driving voltage VDD_S and output it to the gamma voltage calculation circuit 153. The gamma voltage calculation circuit 153 may generate a first gamma reference voltage VREFH and a second gamma reference voltage VREFL using the driving voltage VDD received from the driving voltage supply circuit 160 and the sensed driving voltage VDD_S received from the display panel 110. The power management circuit 150 may output the first gamma reference voltage VREFH to the gamma voltage generation circuit 180 via a first gamma reference voltage line VREFHL. The power management circuit 150 may output the second gamma reference voltage VREFL to the gamma voltage generation circuit 180 via a second gamma reference voltage line VREFLL.

The gamma voltage generation circuit 180 may be electrically connected to the power management circuit 150 via the first gamma reference voltage line VREFHL and the second gamma reference voltage line VREFLL. The gamma voltage generation circuit 180 may generate a gamma reference voltage VREFG using the first gamma reference voltage VREFH and the second gamma reference voltage VREFL. The gamma voltage generation circuit 180 may output the gamma reference voltage VREFG to the data driving circuit 130 through a gamma reference voltage line VREFGL.

The data driving circuit 130 may be connected to the gamma voltage generation circuit 180 via the gamma reference voltage line VREFGL. The data driving circuit 130 may generate the data voltage VDATA using the gamma reference voltage VREFG input via the gamma reference voltage line VREFGL. The data driving circuit 130 may output the data voltage VDATA to the display panel 110 via the data line DL.

The display panel 110 may be electrically connected to the data driving circuit 130 via the data line DL. The display panel 110 may display an image according to the data voltage VDATA received via the data line DL.

The following describes the operation in which the gamma voltage generation circuit 180 generates a gamma reference voltage VREFG.

Figure 4:
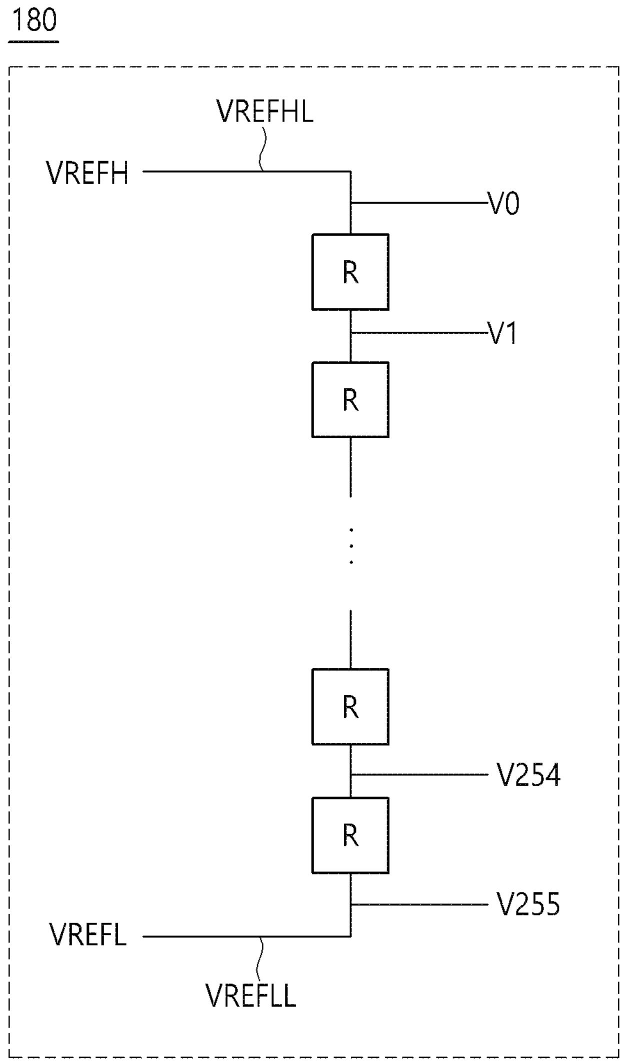
FIG. 4 is a diagram illustrating a gamma voltage generation circuit of the display device according to example embodiments of the present disclosure.

FIG. 4 illustrates an example of a gamma voltage generation circuit 180 of a display device 100 according to example embodiments of the present disclosure.

As shown in FIG. 4, the gamma voltage generation circuit 180 may include a first gamma reference voltage line VREFHL to which a first gamma reference voltage VREFH is input, a second gamma reference voltage line VREFLL to which a second gamma reference voltage VREFL is input, and a plurality of resistor strings R that divide the first and second gamma reference voltages VREFH and VREFL.

The first gamma reference voltage VREFH may be a 0-level gamma voltage applied to the upper end of the resistor string R, and the second gamma reference voltage VREFL may be a 255-level gamma voltage applied to the lower end of the resistor string R.

Accordingly, the gamma voltage generation circuit 180 may divide the first and second gamma reference voltages VREFH and VREFL using the resistor strings R and output a gamma reference voltage corresponding to a plurality of grayscale levels (e.g., level 0, level 1, level 3, level 15, level 31, level 63, level 127, level 191, level 255). For example, it may output a first voltage V0 corresponding to level 0, a second voltage V2 corresponding to level 1, a third voltage V254 corresponding to level 254, and a fourth voltage V255 corresponding to level 255.

As the data voltage VDATA is generated based on the gamma reference voltage VREFG output by the gamma voltage generation circuit 180, it may be possible to compensate for variation in the driving voltage VDD of the display panel 110.

During the process of compensating for variation in the driving voltage VDD using the gamma reference voltage VREFG, appropriate compensation for variation in the driving voltage VDD may not be performed if noise is included in the driving voltage VDD, the sensing driving voltage VDD_S, the first gamma reference voltage VREFH, the second gamma reference voltage VREFL, the gamma reference voltage VREFG, or the data voltage VDATA.

To remove noise, a component (e.g., a filter) for noise elimination may be used. Accordingly, a method for stably maintaining the driving voltage VDD without sensing it may be employed.

Hereinafter, a display device 100 that minimizes or reduces variation in the driving voltage VDD using the charge storage circuit 170 will be described.

Figure 5:
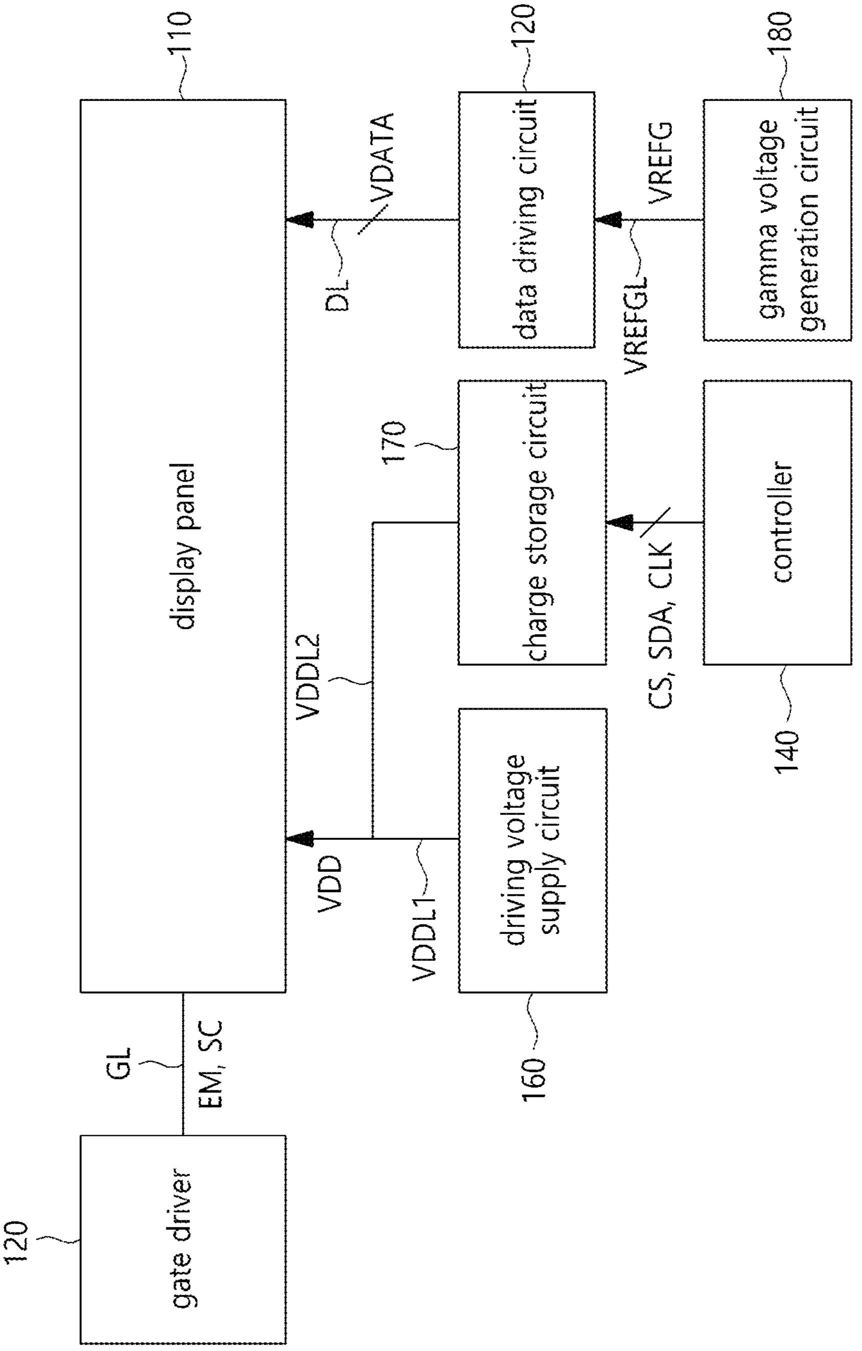
FIG. 5 is a diagram illustrating a display device including a charge storage circuit according to example embodiments of the present disclosure.

FIG. 5 illustrates an example of a display device 100 including a charge storage circuit 170 according to example embodiments of the present disclosure.

As shown in FIG. 5, the gate driving circuit 120 may output an emission control signal EM and a scan signal SC to the display panel 110 through a gate line GL. The display panel 110 may control the light emission timing of a sub-pixel SP using the emission control signal EM. The display panel 110 may control the timing of supplying a data voltage VDATA to the sub-pixel SP using the scan signal SC. A detailed explanation of this is illustrated in the description below with reference to FIG. 6.

The driving voltage supply circuit 160 may be electrically connected to the display panel 110 via a first driving voltage line VDDL1. The driving voltage supply circuit 160 may be electrically connected to the charge storage circuit 170 via a second driving voltage line VDDL2. The driving voltage supply circuit 160 may output the driving voltage VDD to the display panel 110 through the first driving voltage line VDDL1. The driving voltage supply circuit 160 may output the driving voltage VDD to the charge storage circuit 170 through the second driving voltage line VDDL2.

The charge storage circuit 170 may store charge in response to receiving the driving voltage VDD output from the driving voltage supply circuit 160. The charge storage circuit 170 may output the stored charge to the output node of the driving voltage supply circuit 160 and to the display panel 110. A detailed explanation of this is illustrated in the description below with reference to FIG. 9.

The controller 140 may control the driving voltage supply circuit 160 and the charge storage circuit 170.The controller 140 may output a control signal CS, a data signal SDA, and a clock signal CLK to the charge storage circuit 170. The charge storage circuit 170 may control the connection between the charge storage circuit 170 and the driving voltage supply circuit 160 using the received control signal CS, data signal SDA, and clock signal CLK. Specifcially, the controller 140 outputs a control signal to the charge storage circuit 170 based on changes in a gradation of the image per region in the display panel 110. A detailed explanation of this is illustrated in the description below with reference to FIG. 9.

Descriptions of the gamma voltage generation circuit 180, data driving circuit 120, gamma reference voltage line VREFGL, gamma reference voltage VREFG, data line DL, and data voltage VDATA are omitted here since they overlap with the explanation in FIG. 3.

The grayscale level of an image displayed on the display device 100 is proportional to the current of the display panel 110. While the display device 100 is driven at a low grayscale level, controlling the current level may be more difficult than during high grayscale driving.

While the display device 100 is driven at a low grayscale level, the display device 100 may maintain a constant current level and use a driving method that controls the light emission time or light emission area of the sub-pixel SP. A driving method that controls the light emission time or light emission area of the sub-pixel SP may be referred to as EM duty driving.

Hereinafter, a display device 100 that performs EM duty driving will be described as an example.

Figure 6:
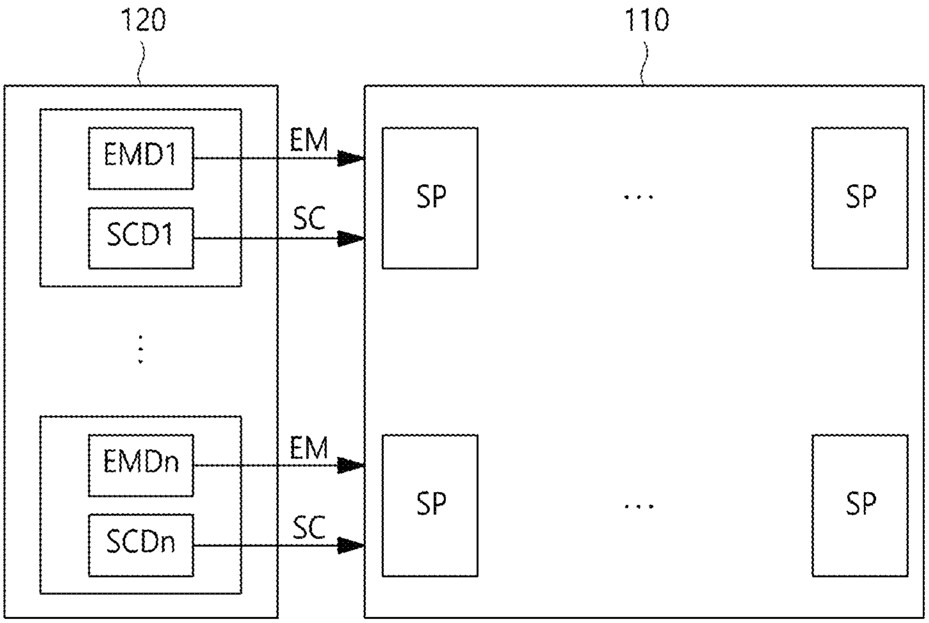
FIG. 6 is a diagram illustrating a plurality of sub-pixels receiving signals from a gate driving circuit of the display device according to example embodiments of the present disclosure.

FIG. 6 illustrates a plurality of sub-pixels SP that receive signals from the gate driving circuit 120 in a display device 100 according to example embodiments of the present disclosure.

The gate driving circuit 120 may include a plurality of emission drivers (e.g., a first emission driver EMD1 and an nth emission driver EMDn) and a plurality of scan drivers (e.g., a first scan driver SCD1 and an nth scan driver SCDn).

The emission driver may output an emission control signal EM to the sub-pixel SP. The sub-pixel SP may emit light upon receiving the emission control signal EM at a turn-on level.

The scan driver may output a scan signal SC to the sub-pixel SP. The sub-pixel SP may receive a data voltage VDATA from the data driving circuit 130 upon receiving the scan signal SC at a turn-on level.

By outputting the emission control signal EM at a turn-on level to sub-pixels SP in a specific region, the display device 100 may control only a specific region of the display panel 110 to emit light.

Among the plurality of sub-pixels SP in the display panel 110, only those arranged in multiple rows may emit light, and sub-pixels arranged in other rows may not emit light. Accordingly, the display device 100 may sequentially cause the plurality of sub-pixels SP to emit light.

Hereinafter, the sequential light emission of the plurality of sub-pixels SP will be described.

Figure 7:
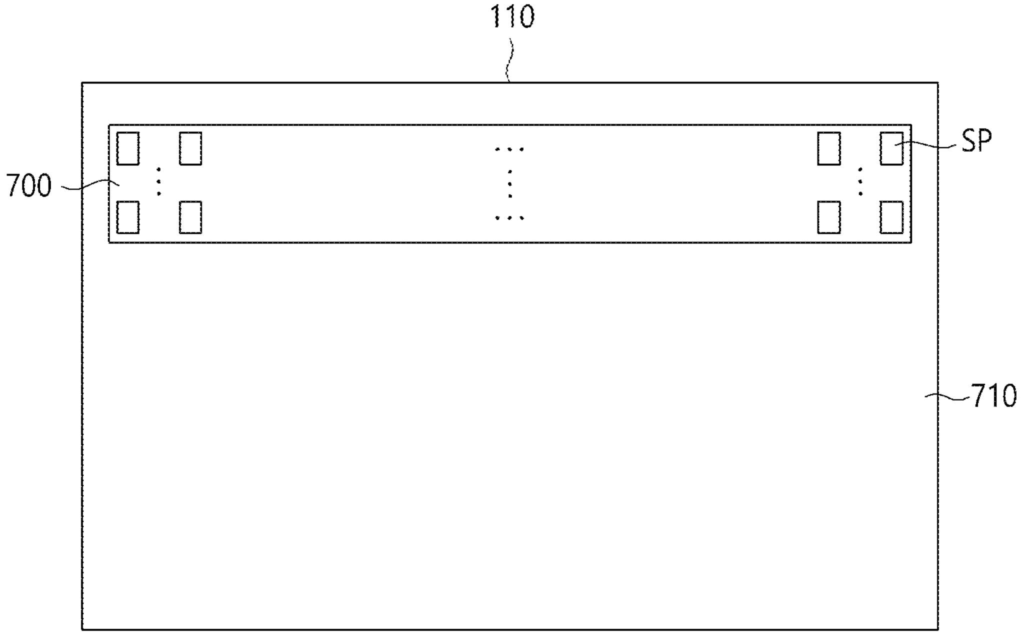
FIG. 7 is a diagram illustrating a driving method of the display device according to example embodiments of the present disclosure.

FIG. 7 is a diagram illustrating an example of a driving method of the display device 100 according to example embodiments of the present disclosure.

As shown in FIG. 7, the display panel 110 may include a light-emitting area 700 and a non-light-emitting area 710. The light-emitting area 700 may be a region where a plurality of sub-pixels SP to which an emission control signal EM at a turn-on level is input are arranged. The non-light-emitting area may be a region where a plurality of sub-pixels SP to which the emission control signal EM at a turn-off level is input are arranged.

For example, the display device 100 may supply a data voltage VDATA by outputting the scan signal SC at a turn-on level to the plurality of sub-pixels SP arranged on the display panel 110. The time interval between the point at which the data voltage VDATA for displaying one frame is supplied to all the sub-pixels SP of the display panel 110 and the point at which the data voltage VDATA for displaying the next frame is supplied may be referred to as a frame time.

The display device 100 may control the plurality of sub-pixels SP to emit light N times during the frame time. N may be a natural number.

For example, after the data voltage VDATA for displaying one frame is supplied to all the sub-pixels SP of the display panel 110, the display device 100 may sequentially supply the emission control signal EM along rows to the sub-pixels SP arranged in multiple rows.

For example, after the data voltage VDATA for displaying one frame is supplied to all the sub-pixels SP of the display panel 110, the display device 100 may output the emission control signal EM at a turn-on level to the sub-pixels SP arranged in N rows among the plurality of sub-pixels SP arranged in a matrix form, and output the emission control signal EM at a turn-off level to the sub-pixels SP arranged in the other rows.

After the emission control signal EM at the turn-on level applied to the plurality of sub-pixels SP arranged in the N rows is changed to the turn-off level, the display device 100 may output the emission control signal EM at the turn-on level to the plurality of sub-pixels SP arranged in another N rows, and output the emission control signal EM at the turn-off level to the sub-pixels SP in other rows. As the operation of the display device 100 is repeated, the plurality of sub-pixels SP may emit light sequentially in N-row units. N may be a natural number.

After the plurality of sub-pixels SP of the display panel 110 emit light N times, the data voltage VDATA for displaying the next frame may be supplied. Accordingly, as the number of light emissions of the sub-pixels SP during the frame time is adjusted, a gradation of the image displayed by the display device 100 may be adjusted. A driving method in which the number of light emissions is adjusted based on sequential sub-pixel SP emission may be referred to as EM duty driving.

Hereinafter, a sub-pixel SP to which the emission control signal EM and the scan signal SC are input will be described.

Figure 8:
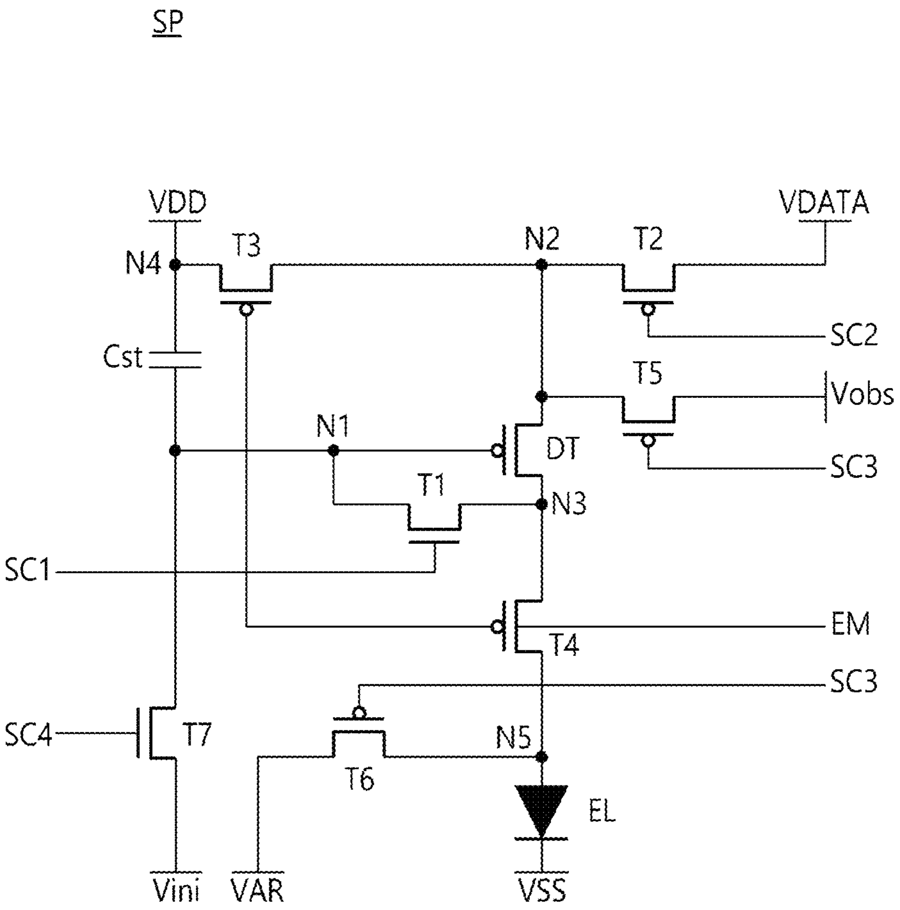
FIG. 8 is a diagram of a sub-pixel in the display device according to an example embodiment.

FIG. 8 is a diagram of a sub-pixel SP in the display device 100 according to an example embodiment.

The description in FIG. 8 is merely illustrative of a sub-pixel SP, and is not limited to the structure in which the emission control signal EM is applied to control the emission of the light-emitting element EL.

As shown in FIG. 8, the sub-pixel SP may include a driving transistor DT and a light-emitting element EL connected to the driving transistor DT. The sub-pixel SP may drive the light-emiitting element EL by controlling a driving current flowing into the light-emiitting element EL. The sub-pixel SP may include the driving transistor DT, first through seventh transistors T1 through T7, and a capacitor Cst. Each of the transistors may be a P-type or N-type thin film transistor. Hereinafter, it is illustrated that the first transistor T1 and the seventh transistor T7 are N-type thin film transistors, and the remaining transistors DT and T2 through T6 are P-type thin film transistors.

The light-emiitting element EL may include an anode electrode and a cathode electrode. The anode electrode of the light-emiitting element EL may be connected to a fifth node N5, and the cathode electrode may be connected to a low potential driving voltage VSS.

The driving transistor DT may include a first electrode connected to a second node N2, a second electrode connected to a third node N3, and a gate electrode connected to a first node N1.

The first transistor T1 may include a first electrode connected to the first node N1, a second electrode connected to the third node N3, and a gate electrode for receiving a first scan signal SC1. The first transistor T1 may turn on in response to the first scan signal SC1, and by being diode-connected between the first node N1 and the third node N3, may sample the threshold voltage Vth of the driving transistor DT.

The capacitor Cst may be connected or formed between a first node N1 and a fourth node N4. The capacitor Cst may store or maintain the supplied high potential driving voltage VDD.

A second transistor T2 may include a first electrode connected to a data line DL, a second electrode connected to a second node N2, and a gate electrode that receives a second scan signal SC2. The second transistor T2 may be turned on in response to the second scan signal SC2.

A third transistor T3 and a fourth transistor T4 may be connected between the high potential driving voltage VDD and the light-emiitting element EL. The third transistor T3 may include a first electrode connected to a fourth node N4 for receiving the high potential driving voltage VDD, a second electrode connected to the second node N2, and a gate electrode that receives an emission control signal EM. The fourth transistor T4 may include a first electrode connected to a third node N3, a second electrode connected to a fifth node N5, and a gate electrode that receives the emission control signal EM. As the third and fourth transistors T3 and T4 are turned on in response to the emission control signal EM, the light-emiitting element EL may emit light corresponding to a driving current.

A fifth transistor T5 may include a first electrode that receives a bias voltage Vobs, a second electrode connected to the second node N2, and a gate electrode that receives a third scan signal SC3. A sixth transistor T6 may include a first electrode that receives a first initialization voltage VAR, a second electrode connected to the fifth node N5, and a gate electrode that receives the third scan signal SC3.

The sixth transistor T6 may be turned on in response to the third scan signal SC3 before the light-emiitting element EL emits light, and may initialize the anode electrode of the light-emiitting element EL using the first initialization voltage VAR. The light-emiitting element EL may include a parasitic capacitor formed between the anode electrode and the cathode electrode. The parasitic capacitor may be charged during light emission of the light-emiitting element EL. Accordingly, by applying the first initialization voltage VAR to the anode electrode of the light-emiitting element EL via the sixth transistor T6, the amount of accumulated charge in the light-emiitting element EL may be initialized.

The gate electrodes of the fifth and sixth transistors T5 and T6 may commonly receive the third scan signal SC3. A seventh transistor T7 may include a first electrode that receives a second initialization voltage Vini, a second electrode connected to the first node N1, and a gate electrode that receives a fourth scan signal SC4. The seventh transistor T7 may be turned on in response to the fourth scan signal SC4, and may initialize the gate electrode of the driving transistor DT using the second initialization voltage Vini.

The structure of the sub-pixel SP illustrated in FIG. 8 is merely an example and may be variously modified.

While the sub-pixel SP is driven with an EM duty cycle via the emission control signal EM, the emission control signal EM may be supplied multiple times within a single frame, and the current level in the display panel 110 may vary at the time the sub-pixel SP is turned on or off. While the current level in the display panel 110 is fluctuating, the driving voltage VDD or the data voltage VDATA may temporarily vary. This temporary variation in the driving voltage VDD or data voltage VDATA may be referred to as ripple.

As the driving voltage VDD or the data voltage VDATA varies, the difference between the driving voltage VDD and the data voltage VDATA may also fluctuate. As a result of this variation, the intended image may not be properly displayed or blemishes may appear on the display panel 110.

Hereinafter, a charge storage circuit 170 that prevents or suppresses variation in the driving voltage VDD will be described.

Figure 9:
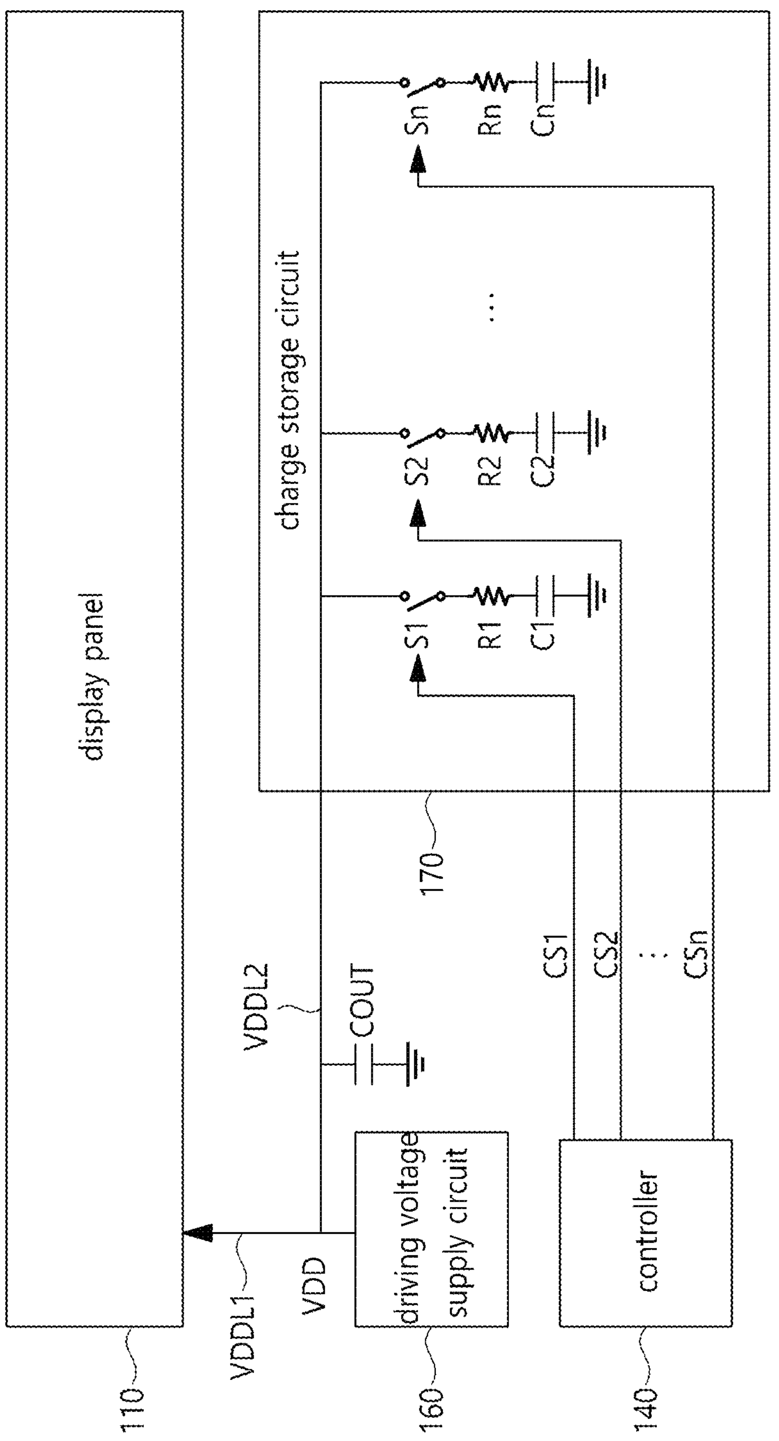
FIG. 9 is a diagram illustrating a connection structure of a charge storage circuit according to example embodiments of the present disclosure.

FIG. 9 is a diagram illustrating a connection relationship of the charge storage circuit 170 according to example embodiments of the present disclosure.

Descriptions of the driving voltage supply circuit 160 and the display panel 110 that overlap with the description in FIG. 5 may be omitted.

As shown in FIG. 9, the charge storage circuit 170 may include a plurality of switches (e.g., a first switch S1, a second switch S2, and an nth switch Sn) connected in parallel to the second driving voltage line VDDL2, a plurality of capacitors (e.g., a first capacitor C1, a second capacitor C2, and an nth capacitor Cn) respectively electrically connected to the plurality of switches, and a plurality of resistors (e.g., a first resistor R1, a second resistor R2, and an nth resistor Rn) respectively electrically connected to the plurality of switches.

While the current flowing through the display panel 110 increases, when at least some of the plurality of switches are in the turned-on state, the plurality of capacitors connected to the turned-on switches may be discharged. As the plurality of capacitors are discharged, ripple generated by the variation in current may be minimized or reduced.

Figure 10:
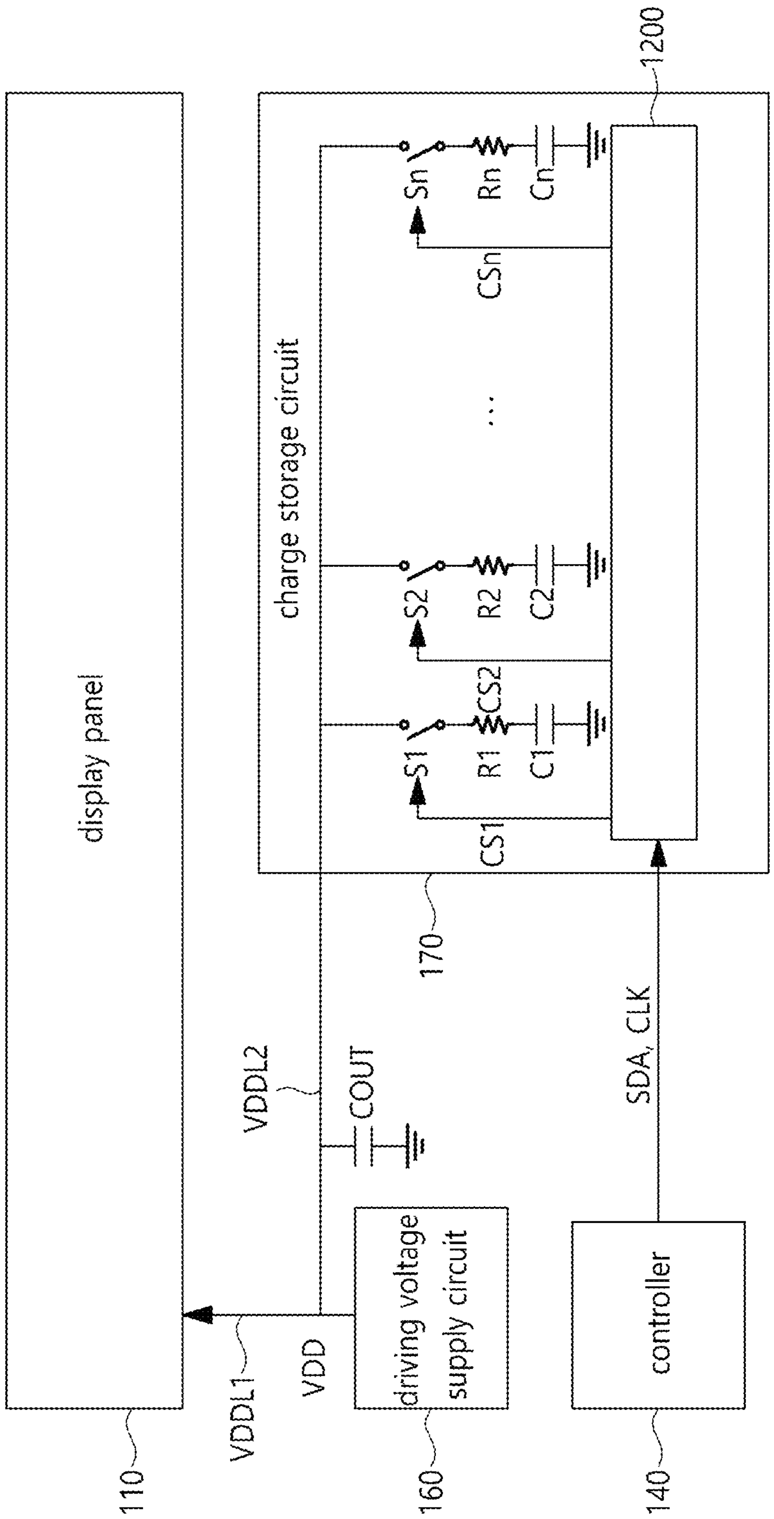
FIG. 10 is a diagram illustrating a connection structure of a charge storage circuit including a decoder according to example embodiments of the present disclosure.

While the current flowing through the display panel 110 decreases, when at least some of the plurality of switches are in the turned-on state, the plurality of capacitors connected to the turned-on switches may be charged. As the plurality of capacitors are charged, ripple generated by the variation in current may be minimized or reduced. The switching operation of the plurality of switches is illustrated in the description of FIG. 10.

An output capacitor COUT may be electrically connected between the charge storage circuit 170 and the driving voltage supply circuit 160.

After at least some of the plurality of switches are turned on and then turned off, the current level flowing through the display panel 110 may fluctuate. To prevent or suppress the variation in the current level flowing through the display panel 110, at least some of the switches that are turned on may be turned off after the voltage or charge amount of the output capacitor COUT becomes equal to the voltage or charge amount of at least some of the capacitors respectively connected to the turned-on switches.

The controller 140 may output a plurality of control signals corresponding to the plurality of switches (e.g., a first control signal CS1, a second control signal CS2, and an nth control signal CSn) to the charge storage circuit 170. Based on the plurality of control signals CS, the turned-on state and turned-off state of each of the plurality of switches may be controlled.

The current level flowing through the display panel 110 may be proportional to the brightness (or magnitude) of the displayed image data DATA and the data voltage VDATA. Depending on the value of the data voltage VDATA output to the light-emitting area 700 or the current level flowing through the display panel 110, the number of capacitors to be charged or discharged and the number of switches to be turned on, may be determined.

Referring again to FIG. 9, the controller 140 may output the plurality of control signals CS to the charge storage circuit 170 based on the data voltage VDATA supplied to the sub-pixel SP. For example, the controller 140 may analyze the pattern of the image, the image data DATA, the current flowing through the display panel 110 as a result of outputting the image data DATA, or the data voltage VDATA, and determine, based on the analysis result, the number of capacitors to be charged or discharged. The controller 140 may output the plurality of control signals CS having turn-on and turn-off levels to the charge storage circuit 170 based on the determined number of capacitors. The number of control signals CS having turn-on levels may be proportional to the value of the data voltage VDATA or the current level in the display panel 110.

FIG. 10 is a diagram illustrating a connection relationship of a charge storage circuit 170 including a decoder 1200 according to example embodiments of the present disclosure.

Descriptions of the display panel 110, the driving voltage supply circuit 160, the charge storage circuit 170, and the controller 140 that overlap with the description in FIG. 9 may be omitted.

The charge storage circuit 170 may include the decoder 1200. The decoder 1200 may output control signals CS1 to CSn to corresponding multiple switches S1 to Sn. The number of switches turned on in response to the turn-on level control signals CS1 to CSn, output from the decoder 1200, may vary. Accordingly, the number of signals output from the controller 140 to control the switches may be reduced.

The controller 140 and the decoder 1200 may be connected via a serial interface such as I2C (Inter-Integrated Circuit). The controller 140 may output a data signal SDA and a clock signal CLK to the decoder 1200. The clock signal CLK may include a signal for synchronizing the timing of data transmission.

The data signal SDA may include information regarding the number of switches to be turned on. The controller 140 may analyze the image pattern, image data DATA, current level flowing through the display panel 110 as a result of outputting the image data DATA, or the data voltage VDATA, and based on the analysis result, determine the number of switches to be turned on and the number of capacitors to be charged or discharged. The controller 140 may generate the data signal SDA according to the number of switches to be turned on or the number of capacitors to be charged or discharged. Based on the received data signal SDA, the decoder 1200 may output respective control signals CS to the plurality of switches.

The number of control signals CS having turn-on levels, output based on the data signal SDA, may be proportional to the difference in the data voltage VDATA between areas emitting light sequentially, a difference in the gradation of the image between those areas, or the current level flowing through the display panel 110.

Hereinafter, a timing diagram of the emission control signal EM, control signal CS, driving voltage VDD, data voltage VDATA, current of the charge storage circuit 170, and current of the display panel 110 input to the sub-pixels SP in the light-emitting area 700 of the display device 100 will be described.

Figure 11:
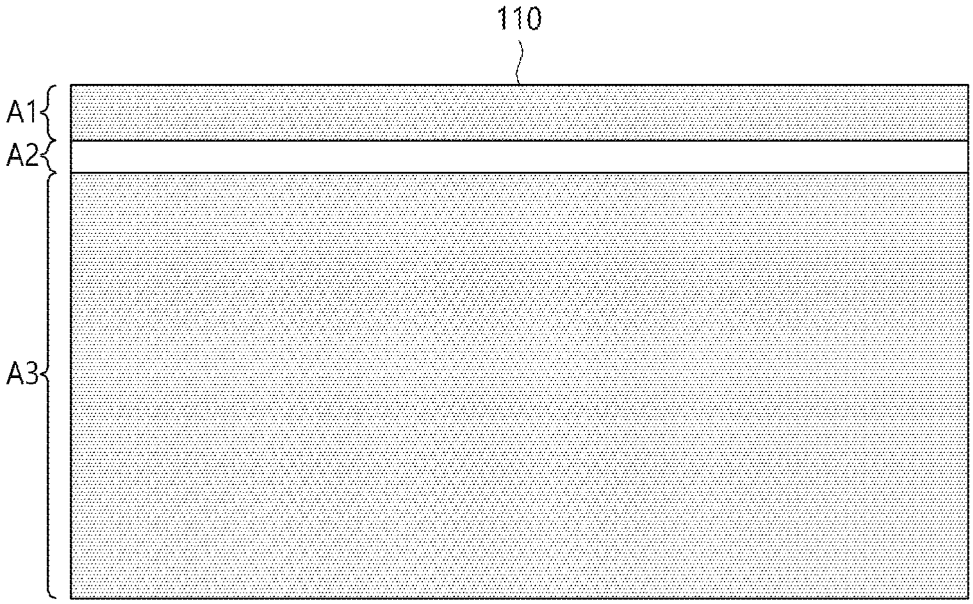
FIG. 11 is a diagram illustrating a display panel emitting light through duty driving according to example embodiments of the present disclosure.
Figure 12:
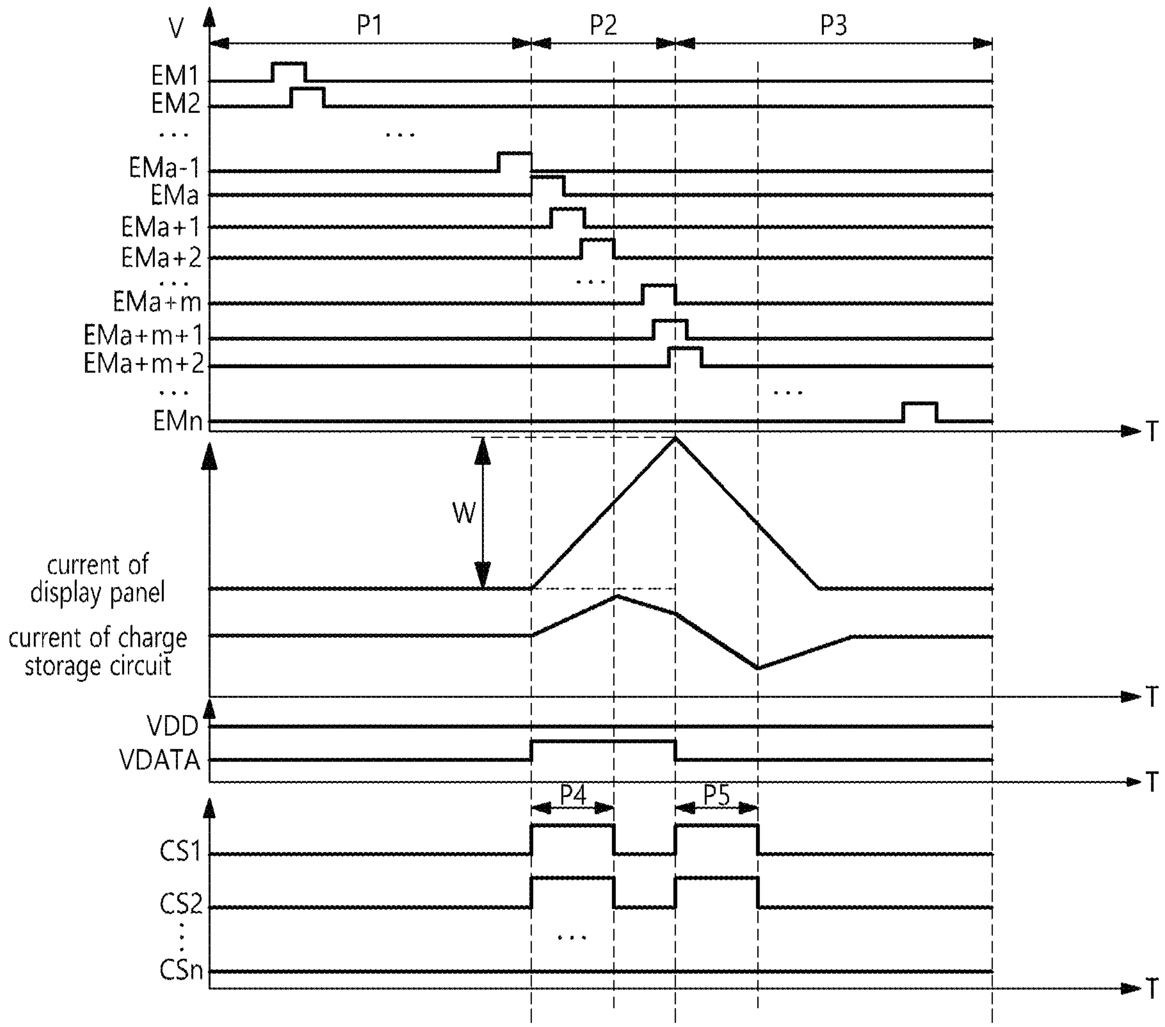
FIG. 12 is a diagram illustrating a timing diagram of the display device according to example embodiments of the present disclosure.

FIG. 11 is a diagram illustrating the display panel 110 emitting light according to duty driving in accordance with example embodiments of the present disclosure, and FIG. 12 is a timing diagram of the display device 100 according to example embodiments of the present disclosure.

As shown in FIG. 11, the display panel 110 may emit light sequentially. For example, a first area A1, a second area A2, and a third area A3 of the display panel 110 may emit light in sequence. The gradation of the image displayed in the second area A2 may be higher than in the first area A1 and the third area A3. Accordingly, the data voltage VDATA supplied to the second area A2 may also be higher than that supplied to the first area A1 and the third area A3.

As shown in FIG. 12, the horizontal axis of the timing diagram may represent time T. The vertical axis of the timing diagram may represent voltage level V or current I.

The period during which the first area A1 emits light may be referred to as a first period P1. The period during which the second area A2 emits light may be referred to as a second period P2. The period during which the third area A3 emits light may be referred to as a third period P3.

While the first area A1 is emitting light, a total of (a−1) emission control signals EM, including a first emission control signal EM1 and a second emission control signal EM2, may sequentially transition to the turn-on level.

While the second area A2 is emitting light, a total of (m+1) emission control signals EM, including the emission control signal EM supplied to the first row of the second area A2, may sequentially transition to the turn-on level.

According to the driving method of the display device 100 in accordance with example embodiments of the present disclosure, the driving period of a sub-pixel SP may include the first period P1, the second period P2, and the third period P3.

During the first period P1, (a−1) emission control signals (e.g., EM1, EM2, EM3, . . . , EMa−1) having turn-on levels may be output to sub-pixels SP arranged in (a−1) rows. For example, the first area A1 may include a plurality of sub-pixels SP arranged in (a−1) rows.

During the second period P2, (m+1) emission control signals (e.g., EMa, EMa+1, EMa+2, . . . , EMa+m) having turn-on levels may be output to sub-pixels SP arranged in (m+1) rows. For example, the second area A2 may include a plurality of sub-pixels SP arranged in (m+1) rows.

During the third period P3, the emission control signal EM having the turn-on level and supplied to the first row of the third area A3, and the emission control signal EM supplied to the sub-pixel SP in the last row (e.g., EMn) may be sequentially applied to a plurality of sub-pixels SP.

During the first period P1, an image with a lower gradation than that displayed in the second area A2 may be displayed in the first area A1.

During the second period P2, the gradation of the image displayed in the second area A2 may be higher than that in the first area A1. Accordingly, the data voltage VDATA supplied to the second area A2 may be higher than that supplied to the first area A1. As the data voltage VDATA supplied to the second area A2 becomes higher than that of the first area A1, the current level in the display panel 110 during image display in the second area A2 may increase compared to that in the first area A1.

As the current level in the display panel 110 increases, the driving voltage VDD or the data voltage VDATA may fluctuate or become unstable.

For example, during the second period P2, the controller 140 may output a plurality of control signals (e.g., a first control signal CS1 and a second control signal CS2) to the charge storage circuit 170 to prevent or suppress fluctuation in the driving voltage VDD or the data voltage VDATA.

For example, at the time when an emission control signal (e.g., EMa), which is output to the first row among the plurality of emission control signals EM supplied to the sub-pixels SP in the second area A2 is turned on, control signals CS1 and CS2 at turn-on levels may be output to the first and second switches S1 and S2. Alternatively, a plurality of control signals CS at turn-on levels may be output to the plurality of switches when the gradation of the image in the light-emitting area of the display panel 110 increases beyond a certain hreshold. Alternatively, the plurality of control signals CS at turn-on levels may be output when the data voltage VDATA in the light-emitting area of the display panel 110 increases beyond a predetermined level. Alternatively, the plurality of control signals CS at turn-on levels may be output to the plurality of switches within a predetermined time after the start of the second period P2.

As a result, the first and second switches S1 and S2 may be turned on and charges stored in the first and second capacitors C1 and C2 may be discharged. Accordingly, the output capacitor COUT may be charged. As the output capacitor COUT is charged, the current level flowing to the display panel 110 may increase rapidly. Accordingly, ripple may be minimized or reduced.

A fourth period P4 may be included within the second period P2. The fourth period P4 may represent a time interval from the moment at least one switch is turned on as the current of the display panel 110 increases, to the moment at least one switch is turned off. For example, a period during which the voltage of at least one capacitor electrically connected to the at least one switch that is turned on becomes equal to the voltage of the output capacitor COUT may be referred to as the fourth period P4. Alternatively, the duration for the amount of charge in the at least one capacitor connected to the the at least one switch that is turned on to become equal to the amount of charge in the output capacitor COUT may be referred to as the fourth period P4 (i.e., the capacitor is charged during this time).

During the third period P3, a plurality of emission control signals EM having turn-on levels may be sequentially output to a plurality of sub-pixels SP arranged in the third area A3. As the gradation of the image displayed in the third area A3 is lower than that in the second area A2, the data voltage VDATA supplied to the third area A3 may be lower than that supplied to the second area A2. As a result, when an image is displayed in the third area A3, the current level of display panel 110 may decrease, as compared to the current level during the display in the second area A2 when an image is displayed in the second area A2.

As the current level of the display panel decreases, the driving voltage VDD or the data voltage VDATA may fluctuate or become unstable.

During the third period P3, to prevent or suppress fluctuation in the driving voltage VDD or the data voltage VDATA, a plurality of control signals (e.g., the first control signal CS1 and the second control signal CS2) at turn-on levels may be output to the charge storage circuit 170.

For example, at the time when at least one of the emission control signals EM (e.g., EMa+m) output to the sub-pixels SP is turned off, the first and second control signals CS1 and CS2 at turn-on levels may be output. Accordingly, the first and second switches S1 and S2 may be turned on at the time when the current begins to decrease.

For example, at the time when the emission control signal EMa+m, supplied to the last row among the plurality of emission control signals EM output to sub-pixels SP in the second area A2, is turned on, the plurality of control signals CS at a turn-on level may be output to the plurality of switches. Alternatively, the plurality of control signals CS at a turn-on level may be output to the plurality of switches when the grayscale level of an image in the light-emitting area of the display panel 110 decreases beyond a certain threshold. Alternatively, the plurality of control signals may be output to the plurality of switches when the data voltage VDATA of the light-emitting area of the display panel 110 drops below a certain level. Alternatively, the plurality of control signals CS at a turn-on level may be output to the plurality of switches within a predetermined time after entering a third period P3.

As at least some of the switches are turned on, current from the charge storage circuit 170 may be conducted to the driving voltage supply circuit 160 or the display panel 110. Accordingly, the first and second capacitors C1 and C2 may be charged. As the first and second capacitors C1 and C2 are charged, the output capacitor COUT may be discharged. As the output capacitor COUT is discharged, the current level in the display panel 110 may rapidly decrease. Accordingly, ripple may be minimized or reduced.

A fifth period P5 may be included within the third period P3. The fifth period P5 may represent a time interval from the moment at least one switch is turned on as the current level of the display panel 110 decreases, to the moment at least one switch is turned off. For example, the period during which the voltage of at least one capacitor electrically connected to the turned-on switch becomes equal to the voltage of the output capacitor COUT may be referred to as the the fifth period P5. Alternatively, the duration for the amount of charge in the at least one capacitor connected to the at least one turned-on switch to become equal to the amount of charge in the output capacitor COUT (i.e., the capacitor is discharged) may be referred to as the fifth period P5.

Even when all of the plurality of switches are in a turned-off state, the current level in the charge storage circuit 170 may vary due to current change factors such as current leakage, interference, noise, residual charge, and discharge in the charge storage circuit 170.

The current level variation W in the display panel 110 may be proportional to the number of the control signals CS having turn-on levels. The difference in data voltage VDATA between areas sequentially changing as images are sequentially displayed on the display panel 110 may be proportional to the number of control signals CS having turn-on levels. The difference in the gradation of the image between sequentially changing areas as images are sequentially displayed on the display panel 110 may also be proportional to the number of control signals CS having turn-on levels.

As at least one switch is turned on by using a plurality of control signals CS, sudden changes in load current in the display panel 110 may be prevented or suppressed. By preventing or suppressing such abrupt current changes, fluctuations in the driving voltage VDD and the data voltage VDATA may be avoided or reduced. Accordingly, the occurrence of image blemishes on the display device 100 may be minimized or reduced.

Hereinafter, various example embodiments of the present disclosure will be described in detail with reference to the accompanying drawings.

The embodiments of the present disclosure described above may be briefly summarized as follows.

A display device may include: a display panel including sub-pixels configued to sequentially emit light along rows based on an emission control signal; a driving voltage supply circuit for supplying a driving voltage to the display panel through a driving voltage line; a charge storage circuit electrically connected to the driving voltage line; and a controller for controlling the driving voltage supply circuit and the charge storage circuit.

The controller may output a control signal to the charge storage circuit based on changes in a gradation of an image per area of the display panel.

The charge storage circuit may include a plurality of switches connected in parallel to the driving voltage line, and a plurality of capacitors respectively connected to the plurality of switches. The plurality of switches may be controlled based on the control signal.

The controller may output a plurality of control signals corresponding to the plurality of switches to the charge storage circuit.

Each of the plurality of switches may be turned on or off based on the plurality of control signals.

The current level variation in the display panel may be proportional to the number of control signals that switch the plurality of switches to the turned-on state.

As the current level in the display panel increases, when at least some of the plurality of switches are turned on, the plurality of capacitors connected to the turned-on switches may be discharged.

As the current level in the display panel decreases, when at least some of the plurality of switches are turned on, the plurality of capacitors connected to the turned-on switches may be charged.

The number of switches turned on among the plurality of switches may be proportional to the magnitude of a data voltage input to the sub-pixel.

As the gradation of the image displayed in a light-emitting area of the display panel increases, when at least some of the plurality of switches are turned on, the plurality of capacitors connected to the turned-on switches may be discharged.

As the gradation of the image displayed in a light-emitting area of the display panel decreases, when at least some of the plurality of switches are turned on, the plurality of capacitors connected to the turned-on switches may be charged.

The display device may further include an output capacitor electrically connected between the charge storage circuit and the driving voltage supply circuit.

When the voltage or amount of charge of the output capacitor becomes equal to the voltage or amount of charge of the plurality of capacitors electrically connected to the turned-on switches, the turned-on switches may be turned off.

The display device may include: a display panel in which a plurality of sub-pixels are arranged in a matrix and sequentially emit light along rows; a driving voltage supply circuit for supplying a driving voltage to the display panel; a charge storage circuit electrically connected to the driving voltage supply circuit; and a controller for controlling the driving voltage supply circuit and the charge storage circuit.

The controller may output a data signal to the charge storage circuit based on changes in a gradation of an image per area of the display panel.

The charge storage circuit may include a plurality of switches electrically connected to the driving voltage supply circuit, a plurality of capacitors respectively connected to the plurality of switches, and a decoder that controls the plurality of switches. The plurality of switches may be controlled based on the data signal output from the controller to the charge storage circuit.

The decoder may receive the data signal and output a plurality of control signals to the plurality of switches. the control signals determines turned-on and turned-off states of the switches based on the received data signal.

The current level variation in the display panel may be proportional to the number of control signals that switch the plurality of switches to the turned-on state.

As the current level in the display panel increases, the plurality of capacitors connected to the plurality of switches may discharge while the plurality of switches are turned on.

As the current level in the display panel decreases, the plurality of capacitors connected to the plurality of switches may charge while the plurality of switches are turned on.

The number of control signals that switch the plurality of switches to a turned-on state may be proportional to the data voltage input to sub-pixel.

As the gradation of the image displayed in the light-emitting area of the display panel changes, the level of at least some of the plurality of control signals may change.

The turned-on and turned-off states of the plurality of switches may be determined according to the change in the level of at least some of the plurality of control signals.

As the gradation of the image displayed in the light-emitting area of the display panel increases, when at least some of the plurality of switches are turned on, the plurality of capacitors connected to the turned-on switches may be discharged.

As the gradation of the image displayed in the light-emitting area of the display panel decreases, when at least some of the plurality of switches are turned on, the plurality of capacitors connected to the turned-on switches may be charged.

The display device may further include an output capacitor electrically connected between the charge storage circuit and the driving voltage supply circuit.

When the voltage or amount of charge of the output capacitor becomes equal to that of the plurality of capacitors electrically connected to the turned-on switches that are turned on, the turned-on switches may be turned off.

The above description has been presented to enable any person skilled in the art to make and use the technical idea of the present disclosure, and has been provided in the context of example applications and their configurations. Various modifications, additions, and substitutions to the described embodiments will be readily apparent to those skilled in the art, and the general principles defined herein may be applied to other embodiments and applications without departing from the spirit and scope of the present disclosure. The above description and the accompanying drawings provide example implementations of the technical idea of the present disclosure for illustrative purposes only. That is, the disclosed embodiments are intended to illustrate the technical idea of the present disclosure by way of example without limiting its scope.

What is claimed is:

1. A display device, comprising:

a display panel including sub-pixels configured to sequentially emit light along rows based on an emission control signal;

a driving voltage supply circuit configured to supply a driving voltage to the display panel via a driving voltage line;

a charge storage circuit electrically connected to the driving voltage line; and a controller configured to control the driving voltage supply circuit and the charge storage circuit, wherein the controller is configured to output a control signal to the charge storage circuit based on changes in a gradation of an image per region in the display panel, and wherein the charge storage circuit includes:

a plurality of switches connected in parallel to the driving voltage line; and a plurality of capacitors electrically connected respectively to the plurality of switches and configured to control the plurality of switches, respectively, based on the control signal.

2. The display device of claim 1, wherein the controller is configured to output a plurality of control signals respectively corresponding to the plurality of switches to the charge storage circuit, and wherein the plurality of switches are configured to be turned on or off based respectively on the plurality of control signals.

3. The display device of claim 2, wherein a number of control signals configured to switch the plurality of switches to a turned-on state is proportional to a change in current of the display panel.

4. The display device of claim 3, wherein as the current of the display panel increases, when at least some of the plurality of switches are turned on, the plurality of capacitors connected to the turned-on switches are discharged.

5. The display device of claim 3, wherein as the current of the display panel decreases, when at least some of the plurality of switches are turned on, the plurality of capacitors connected to the turned-on switches are charged.

6. The display device of claim 2, wherein a number of switches turned on among the plurality of switches is proportional to a magnitude of a data voltage input to a light-emitting sub-pixel among the sub-pixels.

7. The display device of claim 2, wherein as the gradation of the image displayed in a light-emitting area of the display panel increases, when at least some of the plurality of switches are turned on, the plurality of capacitors connected to the turned-on switches are discharged.

8. The display device of claim 7, wherein as the gradation of the image displayed in a light-emitting area of the display panel decreases, when at least some of the plurality of switches are turned on, the plurality of capacitors connected to the turned-on switches charged.

9. The display device of claim 8, further comprising an output capacitor electrically connected between the charge storage circuit and the driving voltage supply circuit, wherein the turned-on switches are turned off, when a voltage or charge amount of the output capacitor becomes equal to a voltage or charge amount of the plurality of capacitors electrically connected to the turned-on switches.

10. A display device, comprising:

a display panel in which a plurality of sub-pixels are arranged in a matrix and are configured to sequentially emit light along rows;

a driving voltage supply circuit configrued to supply a driving voltage to the display panel;

a charge storage circuit electrically connected to the driving voltage supply circuit; and a controller coinfigured to control the driving voltage supply circuit and the charge storage circuit, wherein the controller is configured to output a data signal to the charge storage circuit based on a change in a gradation of an image per region of the display panel, wherein the charge storage circuit includes a plurality of switches electrically connected to the driving voltage supply circuit, a plurality of capacitors electrically connected respectively to the plurality of switches, and a decoder configured to control the plurality of switches, and wherein the plurality of switches are configured to be controlled according to the data signal output from the controller to the charge storage circuit.

11. The display device of claim 10, wherein the decoder is configured to receive the data signal and to output a plurality of control signals respctively to the plurality of switches, wherein the plurality of control signals determines turned-on or turned-off states of the plurality of switches, respectively, based on the received data signal.

12. The display device of claim 11, wherein a number of control signals that switch the plurality of switches to a turned-on state, among the plurality of control signals, is proportional to a change in current of the display panel.

13. The display device of claim 12, wherein as the current of the display panel increases, the plurality of capacitors connected to the plurality of switches discharge while the plurality of switches are turned on.

14. The display device of claim 13, wherein as the current of the display panel decreases, the plurality of capacitors connected to the plurality of switches charge while the plurality of switches are turned on.

15. The display device of claim 11, wherein a number of control signals that switch the plurality of switches to a turned-on state, among the plurality of control signals, is proportional to a data voltage input to a light-emitting sub-pixel among the sub-pixels.

16. The display device of claim 11, wherein as the gradation of the image displayed in a light-emitting area of the display panel changes, a level of at least some of the plurality of control signals changes, and wherein the turned-on and turned-off states of the plurality of switches are determined according to change in the level of at least some of the plurality of control signals.

17. The display device of claim 16, wherein as the image gradation of the image displayed in a light-emitting area of the display panel increases, when at least some of the plurality of switches are turned on, the plurality of capacitors electrically connected to the turned-on switches are discharged.

18. The display device of claim 17, wherein as the gradation of the image displayed in a light-emitting area of the display panel decreases, when at least some of the plurality of switches are turned on, the plurality of capacitors electrically connected to the turned-on switches are charged.

19. The display device of claim 18, further comprising an output capacitor electrically connected between the charge storage circuit and the driving voltage supply circuit, wherein the turned-on switches are turned off when a voltage or charge amount of the output capacitor becomes equal to a voltage or charge amount of the plurality of capacitors connected to theturned-on switches.

* * * * *